US011998983B2

(12) United States Patent
Üstüner et al.

(10) Patent No.: US 11,998,983 B2
(45) Date of Patent: Jun. 4, 2024

(54) METHOD FOR HEAT TREATING AN OBJECT

(71) Applicant: Vacuumschmelze GmbH & Co KG, Hanau (DE)

(72) Inventors: Kaan Üstüner, Hanau (DE); Matthias Katter, Hanau (DE); Christoph Brombacher, Hanau (DE); Daniela Benedikt, Hanau (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 0 days.

(21) Appl. No.: 17/709,497

(22) Filed: Mar. 31, 2022

(65) Prior Publication Data

US 2022/0324020 A1 Oct. 13, 2022

(30) Foreign Application Priority Data

Mar. 31, 2021 (DE) ........................ 102021108239.0

(51) Int. Cl.
*B22F 3/10* (2006.01)
*B22F 1/00* (2022.01)
(Continued)

(52) U.S. Cl.
CPC .............. *B22F 3/1007* (2013.01); *B22F 1/09* (2022.01); *B22F 3/003* (2013.01); *C21D 9/0025* (2013.01);
(Continued)

(58) Field of Classification Search
CPC .......................... B22F 1/09; B22F 2003/1014; B22F 2201/10; B22F 2301/155; B22F 3/003;
(Continued)

(56) References Cited

U.S. PATENT DOCUMENTS 4,640,902 A * 2/1987 Lange .................. C04B 35/486 501/97.4
5,533,930 A 7/1996 Tsuzuki et al.
(Continued)

FOREIGN PATENT DOCUMENTS

JP S58100403 * 6/1983 .......... C21D 9/0025
JP S58100403 A 6/1983
(Continued)

OTHER PUBLICATIONS

Search and Examination Report issued for Great Britain Patent Application No. 2204590.0, dated Sep. 15, 2022 (3 pages).

*Primary Examiner* — Scott R Kastler
*Assistant Examiner* — Michael Aboagye
(74) *Attorney, Agent, or Firm* — Dickinson Wright PLLC

(57) ABSTRACT

A method is provided in which a lower box comprising a base, walls that surround the base and an open side, and an upper box comprising a cover, walls that surround the cover and an open side are provided. One or more objects are arranged on the base of the lower box. The object(s) are covered with the upper box such that the open side of the upper is oriented towards the base of the box, the walls of the upper box are arranged on the base of the lower box and a gap is formed between the walls of the upper box and the walls of the lower box. A powder material is introduced into the gap in order to form an assembly having an interior. The powder material provides a mechanical obstacle to gas exchange between the interior and the environment. This assembly is then heat treated.

12 Claims, 6 Drawing Sheets

(51) Int. Cl.

| | |
|---|---|
| ***B22F 3/00*** | (2021.01) |
| ***C21D 9/00*** | (2006.01) |
| *F27B 5/16* | (2006.01) |

(52) U.S. Cl.

CPC ... *B22F 2003/1014* (2013.01); *B22F 2201/10* (2013.01); *B22F 2301/155* (2013.01); *F27B 2005/162* (2013.01)

(58) Field of Classification Search

CPC ................. B22F 3/1007; C21D 9/0025; F27B 2005/162; H01F 1/015; H01F 1/0557; H01F 41/0266

USPC ............ 266/262, 249, 250, 252; 419/57, 38; 148/100, 101

See application file for complete search history.

(56) References Cited

U.S. PATENT DOCUMENTS

| | | | | |
|---|---|---|---|---|
| 6,464,931 | B1 * | 10/2002 | Oota | H01F 1/0577 419/38 |
| 6,696,015 | B2 * | 2/2004 | Tokuhara | H01F 41/0253 419/57 |
| 6,743,394 | B2 * | 6/2004 | Oota | H01F 1/0557 419/38 |
| 7,789,949 | B2 * | 9/2010 | Sparks | H01J 7/183 96/132 |
| 2002/0012600 | A1 | 1/2002 | Tokuhara et al. | |

FOREIGN PATENT DOCUMENTS

| | | | | |
|---|---|---|---|---|
| JP | H03110386 | * | 5/1991 | C21D 9/0025 |
| JP | H03110386 | A | 5/1991 | |
| JP | 2002025842 | A | 1/2002 | |
| JP | 2006249547 | A | 9/2006 | |

* cited by examiner

METHOD FOR HEAT TREATING AN OBJECT

This U.S. patent application claims priority to DE Patent Application No. 10 2021 108 239.0 dated, filed Mar. 31, 2021, the entire contents of which is incorporated herein by reference in its entirety.

BACKGROUND

1. Technical Field

The present invention relates to a method for heat treating an object.

2. Related Art

During heat treatment the composition of objects may change owing, for example, to undesirable reactions with compounds from the environment such as oxygen and humidity. These reactions may adversely affect the properties of the object.

NdFeB- and SmCo-based permanent magnets and magnetocaloric LaFeSi-based moulded parts can be produced using a powder-metallurgical method in which a green body made of compacted powder is heat treated or sintered at high temperatures. However, the rare-earth elements in these alloys exhibit a high reactivity that should be taken into account when handling and sintering green bodies made of these alloy powders containing rare-earth elements if unwanted reactions are to be avoided. For example, there is a risk of the green bodies reacting with the air and absorbing impurities such as oxygen, hydrogen and water vapor during transport between the forming stage and the sintering furnace or during storage between these two process steps. In the sintering furnace there is a risk that organic components, which may be present in the objects as a result of the powder-metallurgical production process and are initially expelled at low temperatures and so have been deposited on cold parts of the sintering furnace, will re-diffuse back onto the parts at high temperatures and result in unwanted carbon contamination of the sintered objects.

Published application JP 2008 251761 A1 discloses a method for the production of a NdFeB magnet designed to prevent the deformation of the magnets during heat treatment. The objects to be heat treated are arranged in a container that is made up of an upper part and a lower part, the upper part forming the cover of the lower part and surrounding the walls of the lower part. Inside this container, shields of stainless steel or NdFeB parts are placed around the parts to be sintered. On one hand, these shields act as radiation shields to prevent the uneven heating of the parts to be sintered and so the associated deformation of the parts. In the case of NdFeB parts, however, these shields also act as getters for carbon, oxygen and nitrogen. The reduction of carbon, oxygen and nitrogen absorption also prevents the deformation of the parts located at the edge of the charge set-up.

However, practice has shown that the reduction in carbon, oxygen and nitrogen absorption due to the positioning of getter parts according to published application JP 2008 251761 A1 is not sufficient for the sintering of particularly high-grade moulded parts containing rare-earth elements.

SUMMARY

An object is therefore to further reduce the absorption of impurities during the handling and sintering of alloys containing rare-earth elements.

According to the invention, a method is provided in which a lower box comprising a base, walls that surround the base, and an open side, and an upper box comprising a cover, walls that surround the cover, and an open side are provided. One or more objects each containing at least one rare-earth element, for example, are arranged on the base of the lower box. The one or more objects are covered with the upper box such that the open side of the upper box is oriented towards the base of the lower box, the walls of the upper box are arranged on the base of the lower box and a gap is formed between the walls of the upper box and the walls of the lower box. A powder material is introduced into the gap in order to form an assembly having an interior. The powder material provides a mechanical obstacle to gas exchange between the interior and the environment. This assembly is then heat treated.

First, the objects or parts to be heat treated are placed centrally in a box-shaped, lower sinter box that is open at the top and can also be called a trough. A second, box-shaped upper sinter box that is open at the bottom and can also be called a cover is then placed over the objects. The external lateral dimensions of this second box are smaller than the internal lateral dimensions of the first box. This arrangement results in a closed interior in which the objects are enclosed on all sides. A gap is formed between the two boxes into which the powder material is then introduced.

Since the walls of the upper box are arranged on the base of the lower box, the upward oriented walls of the lower box surround the downward oriented walls of the upper box. This creates a ring-shaped gap between the walls of the lower and upper boxes that serves as a ring-shaped container that has a base and in which the powder material can be received and held. The air pathway between the objects or the interior and the environment is thus at least partially blocked or sealed by the powder material with the result that gas or volatile compounds from the environment must cover a longer pathway to reach the interior. This enables the penetration of these gases and compounds into the interior to be reduced, a reaction with the objects to be prevented or at least reduced, and the desired properties of the objects to be achieved more reliably.

Since an air pathway remains available and the interior is not entirely sealed against the environment, unwanted volatile components such as organic residues, moisture, oxygen or carbon dioxide present in the objects or on the surfaces of the objects can be removed from the interior at the same time by means of a pumping process so that they do not adversely affect the properties of the objects.

In an alternative method for the heat treatment of an object a plate and a box comprising a base, walls that surround the base, and an open side, can be provided, the base having at least one hole. A powder material is arranged on the base of the lower box, the plate is arranged on the powder material and one or more objects are arranged on the plate. A cover is placed on the box, the one or more objects thus being covered and an assembly having an interior thus being formed. The powder material provides a mechanical obstacle to gas exchange between the interior and the environment. The assembly is heat treated.

These two alternative assemblies are suitable for the heat treatment, e.g. the sintering, of objects such as green bodies that contain one or more rare-earth elements. In this context, the term rare-earth element is used to mean the elements Sc, Y, La, Ce, Pr, Nd, Pm, Sm, Eu, Gd, Tb, Dy, Ho, Er, Tm, Yb and Lu. This assembly is also suitable for the heat treatment, e.g. the sintering, of objects such as green bodies that contain one more rare-earth elements with a high reactivity such as Nd, Sm, Dy and La. This method may be used to produce objects such as SmCo magnets, NdFeB-based magnets containing a proportion of dysprosium, for example, and LaSiFe-based magnetocalorically active moulded parts.

On one hand, this provides sinter packaging that permits conventional charging of the sintering furnace in air without the green bodies made of alloys containing rare-earth elements absorbing a significant quantity of oxygen and humidity. On the other, the sinter packaging prevents the further absorption of impurities such as oxygen, carbon and nitrogen from the environment during sinter treatment. In some embodiments the packaging also prevents the loss of volatile rare-earth elements such as samarium and dysprosium during sinter treatment due to evaporation at above approx. 900° C. since the powder material also provides a mechanical obstacle to the escape of components of the objects with a high vapor pressure such as samarium and dysprosium from the interior to the environment.

All these measures result in an improvement in heat treatment performance. Moreover, the improved sinter packaging obviates the need to acquire costly, fully encapsulated transport systems between the forming stage and the sintering furnace. Finally, and specifically in the case of SmCo magnets, it is also possible using the new sinter packaging to produce new qualities that have particularly stringent requirements in terms of rare-earth element content and contamination levels.

The two part boxes are preferably both fully gas-tight as far as the missing cover or base area. This ensures that the only gas exchange between the inside of the sinter packaging, and the environment takes place by means of gas diffusion through the powder material.

In some embodiments the powder material consists of an inert material, e.g. a ceramic such as $Al_2O_3$, and serves exclusively as a mechanical obstacle to gas exchange. In some embodiments the powder material functions not only as a mechanical obstacle to gas exchange but also as an active material, e.g. a getter. The powder material in the gap thus serves as a getter bed.

Owing to the high reactivity of the getter powder, impurities are effectively bound by oxygen, water vapor, nitrogen and carbon-containing gases. At the same time, the loose filling of getter powder enables the evacuation of the box required for the exchange of process gases such as hydrogen and argon. When sintering alloys containing samarium or dysprosium, the getter powder preferably contains samarium or dysprosium. In addition to the getter effect, these elements in the getter bed result in an increased vapor pressure that effectively counters the evaporation of these elements from the surface of the sintered parts.

The powder material may have a mean grain size of less than 500 μm. The mean grain size can be selected so as to set the flow resistance of the bulk powder and, in case of an active getter, the getter effect.

In some embodiments the powder material is applied in the edge region of the base of the lower box, and the walls of the upper box are then arranged on the powder material. This embodiment can be used to ensure that the wall thickness of the upper box is in contact with the powder material in order to partially seal the boundary between the interior and the gap or the environment.

There are no major requirements here as to the fit between the two boxes since they are substantially sealed by the bulk powder. To prevent cavities in the bulk getter, the powder may also be pressed into the gap using a suitable tool. The getter powder can also be bedded in with a suitable inert solvent, which can then be pumped out again before sintering.

In an embodiment the powder material is introduced into the gap. This embodiment may be used alone, i.e. the walls of the upper box are first arranged on the lower box and the powder material is then introduced into the gap. This sequence has the advantage that the arrangement of the material separately from the objects is easier. This embodiment can also be used after the powder material has been applied in the edge region of the base of the lower box and the walls of the upper box have been arranged on the powder material. This combination has the advantage that a greater length of air pathway is filled with the material.

In some embodiments a separating agent intended to prevent the parts from sintering together during heat treatment is optionally scattered on the base of the lower outer box. The parts to be sintered are placed on this separating agent and then covered with the second box that is open at the bottom. The powder material can then be poured onto the upper inner box and comfortably distributed in the gap.

The powder material may contain an inert material and/or a reactive material such as an oxygen getter, for example, in which case the powder material consists of different powder materials.

In some embodiments the powder material has a plurality of different components. For example, a first fraction of the powder may be an inert material and a second fraction of the powder may be another material, e.g. a reactive material such as an oxygen getter, for example. These components may be arranged in layers.

In an embodiment a lower layer of the powder material comprises an inert material and an upper layer comprises a reactive material. The reactive material may be an oxygen getter. The oxygen getter used may be an activated carbon or a metal powder. Suitable metal powders include aluminium, magnesium and calcium, for example.

In some embodiments the powder material has at least one component containing a rare-earth element. The content of the rare-earth element or elements, i.e. at least one of the elements from the group consisting of Sc, Y, La, Ce, Pr, Nd, Pm, Sm, Eu, Gd, Tb, Dy, Ho, Er, Tm, Yb and Lu, may be at least 15 wt % (weight percent).

For example, a rare-earth element with a high vapor pressure may be used. Such an embodiment may be used with objects that also contain a rare-earth element with a high vapor pressure. The powder material may also contain the same rare-earth element with the high vapor pressure in order to compensate for the evaporation of the rare-earth element from the objects and/or to increase the vapor pressure of this rare-earth element in the interior, which can in turn prevent and/or compensate for the evaporation of the rare-earth element from the objects.

This embodiment can be used in order to simultaneously prevent the penetration of oxygen from the environment into the interior and the escape of rare-earth elements from the interior into the environment, since that part of the powder intended to remove the oxygen and prevent the evaporation of the rare-earth elements is adjacent to the environment or the interior and thus affected spatially first in the air pathway.

In some embodiments the object contains samarium or dysprosium. These rare-earth elements have a high vapor pressure. The object to be heat treated object may be made of a SmCo alloy, or a NdFeB-alloy with dysprosium that is heat treated to produce a $Sm_2Co_{17}$-type magnet, or a $Nd_2Fe_{14}$-type magnet. The elements samarium and dysprosium have an influence on the magnetic properties of the object or magnet and the samarium and dysprosium fractions of the object are therefore controlled to achieve the desired properties. In the case of objects containing samarium or dysprosium, the powder material may contain samarium or dysprosium in the form of one or more compounds containing samarium such as samarium hybrid or dysprosium hybrid.

In some embodiments the object comprises a LaSiFe alloy. The LaSiFe alloy may be magnetocalorically active. One example of a LaSiFe alloy with a magnetocalorically active phase is $La_{1-a}R_a(Fe_{1-x-y}T_yM_x)_{13}H_zC_b$ with a $NaZn_{13}$-type structure, M being Si and optionally Al, T being one or more of the elements from the group consisting of Mn, Co, Ni, Ti, V and Cr, and R being one or more of the elements from the group consisting of Ce, Nd, Y and Pr, where $0 \le a \le 0.5$, $0.05 \le x \le 0.2$, $0.003 \le y \le 0.2$, $0 \le z \le 3$ and $0 \le b \le 1.5$.

In some embodiments the object comprises a precursor comprising 2R and 17M, R being at least one of the elements from the group consisting of Ce, La, Nd, Pr, Sm, Eu, Gd, Tb, Dy, Ho, Er, Tm, Yt, Lu Y, and M being one or more of the elements from the group consisting of Co, Fe, Cu and Zr.

In some embodiments R is only samarium. In some embodiments R is samarium and at least one of the elements from the group consisting of Ce, La, Nd, Pr, Gd, Tb, Dy, Ho, Er, Tm, Yt, Lu and Y.

In some embodiments M also comprises one or more of the elements from the group consisting of Fe, Cu, Zr, Ni, Hf and Ti, in addition to Co. In some embodiments 0 wt %≤Hf≤3 wt %, 0 wt %≤Ti≤3 wt %, and 0 wt %≤Ni≤10 wt %.

In some embodiments the object comprises a $Sm_2Co_{17}$-based alloy, it being possible for one or more of the elements from the group consisting of Ce, La, Nd, Pr, Gd, Tb, Dy, Ho, Er, Tm, Yt, Lu and Y to be present in addition to samarium, and for one or more of the elements from the group consisting of Fe, Cu, Zr, Ni, Hf and Ti to be present in addition to Co. In some embodiments 0 wt %≤Hf≤3 wt %, 0 wt %≤Ti≤3 wt %, and 0 wt %≤Ni≤10 wt %.

In some embodiments the base, the walls and seams between the base and the walls of the lower box and the upper box are gas-tight. These embodiments prevent gases escaping from and penetrating into the interior via paths that lie outside the powder material. This makes the powder material more effective.

In some embodiments the assembly is subjected to heat treatment at a temperature above 900° C.

In some embodiments the assembly is set up outside the furnace and then transported to the furnace. In this arrangement, the powder material in the gap between the inside of the walls of the lower box and the outside of the walls of the upper box prevents air from penetrating into the interior during transport.

In some embodiments the upper and lower boxes are made of iron, e.g. an iron foil, or of. molybdenum or alloyed high-temperature steel. These materials are high-temperature-resistant and can be formed into boxes with gas-tight seams.

For commercial production a plurality of objects is usually arranged in an assembly and heat treated simultaneously. In some embodiments the assembly also has a support or retaining structure for the objects, and the objects are arranged in the retaining structure. Typically, the retaining structure is arranged on the base of the lower box, the objects are arranged in the retaining structure and the upper box is then arranged on the lower box.

In an embodiment the retaining structure has a plurality of plates that are stacked one on top of another and held spaced apart by means of supporting frames. At least one plate may have at least one recess for receiving an object.

In an embodiment the retaining structure is formed from a corrugated sheet. This sheet may be made of iron or molybdenum, for example, and be bent in order to produce the corrugated form.

In some embodiments the gap filled with the powder material may also be covered with a frame and/or a cover. The frame can be arranged in the gap and, in some embodiments, directly on the powder material. The additional cover may be attached to the open side of the lower box, for example, and be crimped to the lower box, for example, the open end of the gap being covered by the additional cover. The cover of the upper box is also covered by this additional cover. A combination of a frame in the gap and an additional cover on the open side of the lower box can also be used.

The additional cover can be used to prevent the powder material in the gap from being stirred up during transport, evacuation and gas treatment. The additional cover may take the form of a foil casing designed to prevent any spillage of the powder material or getter powder during further transport. The cover may also serve to prevent the air on the upper side of the bulk getter from being stirred up excessively, and so prevent the accelerated diffusion of the oxygen.

In some embodiments the powder material can also be arranged in a flat gap between a supporting plate and a sealed box encasing the entire set-up, the outer box having a hole under the supporting plate. This hole enables gas exchange to take place between the environment and the objects inside the box, this gas exchange taking place exclusively along the air pathway through the powder material arranged in the gap between the supporting plate and the outer box. In this arrangement the outer box cannot be closed in a gas-tight manner until the objects have been placed on the supporting plate. The outer box can be crimped, soldered or welded closed.

BRIEF DESCRIPTION OF THE DRAWINGS

Various embodiments are explained in greater detail below with reference to the drawings.

DETAILED DESCRIPTION OF EXAMPLE EMBODIMENTS

Figure 1A:
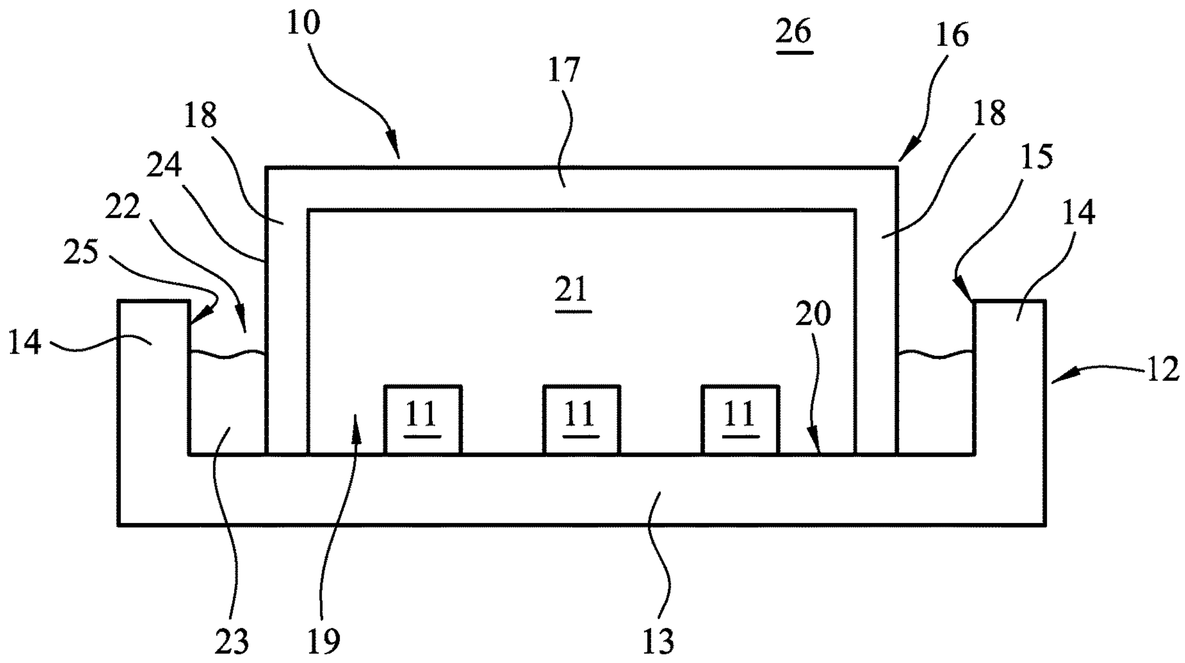
FIG. 1A shows a cross section through an assembly for the heat treatment of an object containing at least one rare-earth element with a high vapor pressure.
Figure 1B:
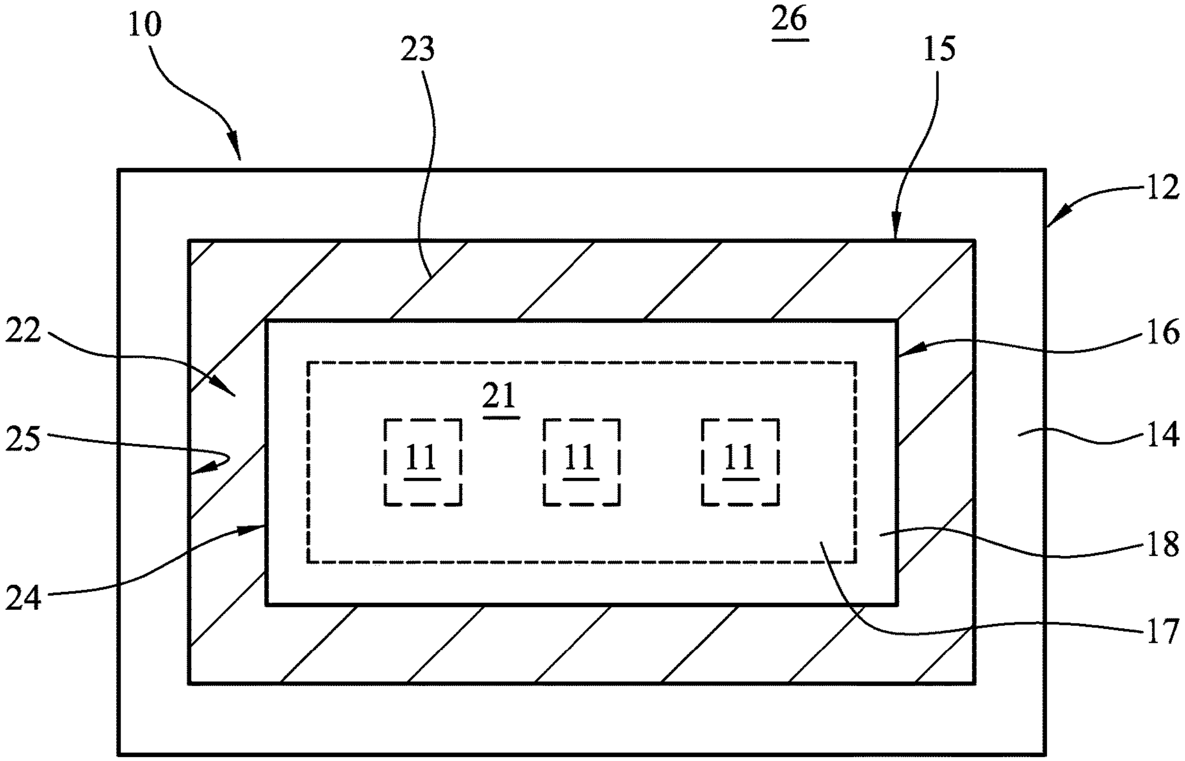
FIG. 1B shows a plan view of the assembly from FIG. 1A.

FIG. 1A shows a cross section through, and FIG. 1B shows a plan view of, an assembly 10 for the heat treatment of at least one object 11. The assembly 10 has a lower box 12 comprising a base 13, walls 14 that surround the base 13, and an open side 15. The lower box 12 thus has the form of a trough that is surrounded on the underside and at the edges by the base 13 and the walls 14 respectively. The assembly 10 also has an upper box 16 comprising a cover 17 and walls 18 that surround the cover 17, thereby forming an open side 19 that is located opposite the cover 17.

The one or more objects 11 are arranged on the upper side 20 of the base 13 of the lower box 12. The one or more objects 11 are then covered with the upper box 16 such that the open side 19 of the upper box 16 faces the base 13 of the lower box 12, the walls 18 are arranged on the upper side 20 of the base 13 of the lower box 12 and the cover 17 of the upper box is arranged above the objects 11. The upper box thus serves as a hood to cover the objects 11. The walls 18 of the upper box 16 are arranged inside the walls 14 of the lower box 12. The objects 11 are thus arranged in a closed interior 21 that is surrounded at the lateral sides by the walls 18 of the upper box and closed on the upper side by the cover 17 of the upper box 16 and on the underside by the base 13 of the lower box 12.

A gap 22 is formed between the walls 18 of the upper box 16 and the walls 14 of the lower box 12. In particular, the ring-shaped gap 22 is formed between the outsides 24 of the walls 18 of the upper box 16 and the insides 25 of the walls 14 of the lower box 12.

A powder material 23 is arranged in the gap 22. The powder material 23 provides a mechanical obstacle to gas exchange between the interior 21 and the environment 26 outside the assembly 10. The powder material 23 is introduced into the gap 22. In some embodiments the upper box 16 is first placed on the base 13 of the lower box 14 and the powder material 23 is then introduced into the gap 22. The walls 14 of the lower box 12 serve to hold the powder material 23 inside the assembly 10 and also to arrange the powder material 23 between the interior 21 and the environment 26. Technically, this means that the air pathway between the interior 21 and the environment 26 is at least partially blocked by the powder material 23. The assembly 10 is heat treated in this set-up.

The mean grain size of the powder material can be selected in order to set the density of the powder and the filled fraction of the volume of the gap 22. The mean grain size may be less than 500 μm, for example.

In some embodiments the composition of the powder material 23 or a fraction of the powder material 23 is selected so as to provide an active function such as a getter, e.g. an oxygen getter, as well as the purely mechanical obstacle to gas exchange.

In some embodiments the powder material 23 has various different compositions or powders. For example, the powder material 23 may contain an active material as well as a fraction of an inert material. The active material may, for example, be an oxygen getter such as activated carbon, or a metal powder such as aluminium, magnesium or calcium. In some embodiments the grains of the active material and the grains of the inert material are mixed together in the gap 22. In some embodiments, however, the different materials are arranged in the gap 22 in layers.

In some embodiments the powder material 23 contains at least one rare-earth element that is also contained in the object 11 in order to compensate for the evaporation of this same rare-earth element from the object 11 and/or to increase the vapor pressure of this rare-earth element in the interior 21 of the assembly 10 in order to prevent at least part of the rare-earth element from evaporating from the objects 11.

In some embodiments the object 11 contains at least one rare-earth element with a high vapor pressure such as samarium or dysprosium. The object 11 may be made of a SmCo alloy in the form of either a green body made of a compressed SmCo alloy powder or a pre-sintered object that already contains a $Sm_2Co_{17}$-based alloy. In this embodiment the powder material 23 may contain samarium, which may be present in the form of a samarium hybrid, for example. The composition can be selected in order to provide the desired vapor pressure with this powder material at the temperatures to be used.

The fraction of the powder material 23 containing a rare-earth element may, for example, be at least 15 wt % in order to increase the vapor pressure of the rare-earth element in the interior 21 and/or to compensate for the evaporation of these same rare-earth elements from the objects 11.

The lower box 12 and the upper box 16 may be made of molybdenum sheets that are, for example, as thin as possible, for example with a wall thickness of no more than 1 mm. The seams between the walls 14 and the base 13 and between the walls 14 are preferably gas-tight and may be welded. The seams between the walls 18 and between the walls 18 and the cover 17 of the upper box 16 may also be welded and thus gas-tight such that gas exchange takes place via the powder material 23 only, thereby preventing the evaporation of the rare-earth element in the object 11 and the penetration of undesired elements from the environment 26 into the interior 21.

In a simple embodiment, the lower box 12 and the upper box 16 may be made of iron foil, two foil sheets being bent to form a trough or a hood.

Figure 2A:
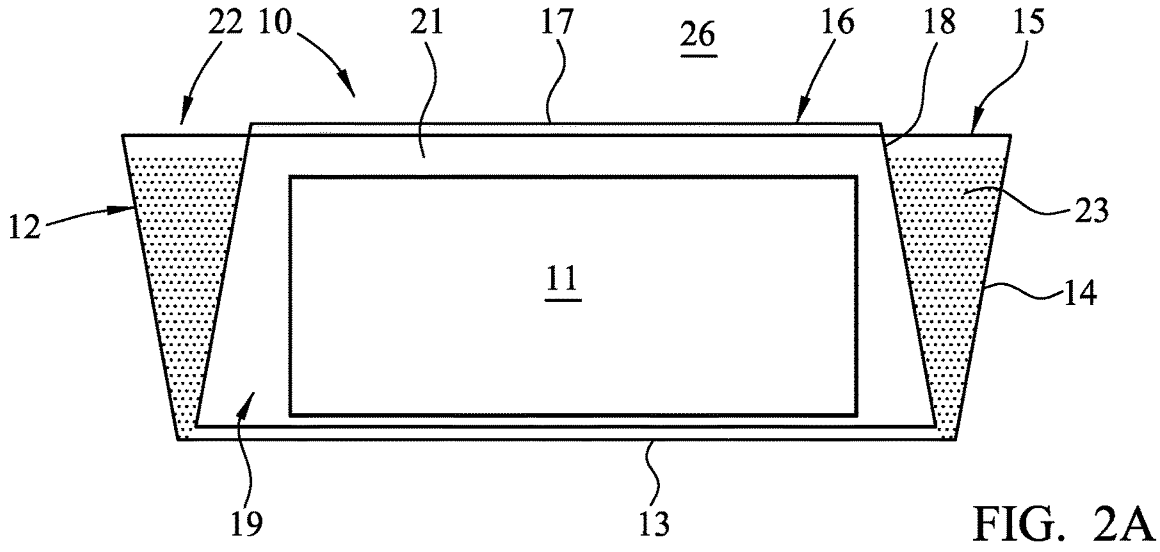
FIG. 2A shows a cross section through an assembly according to an embodiment.
Figure 2B:
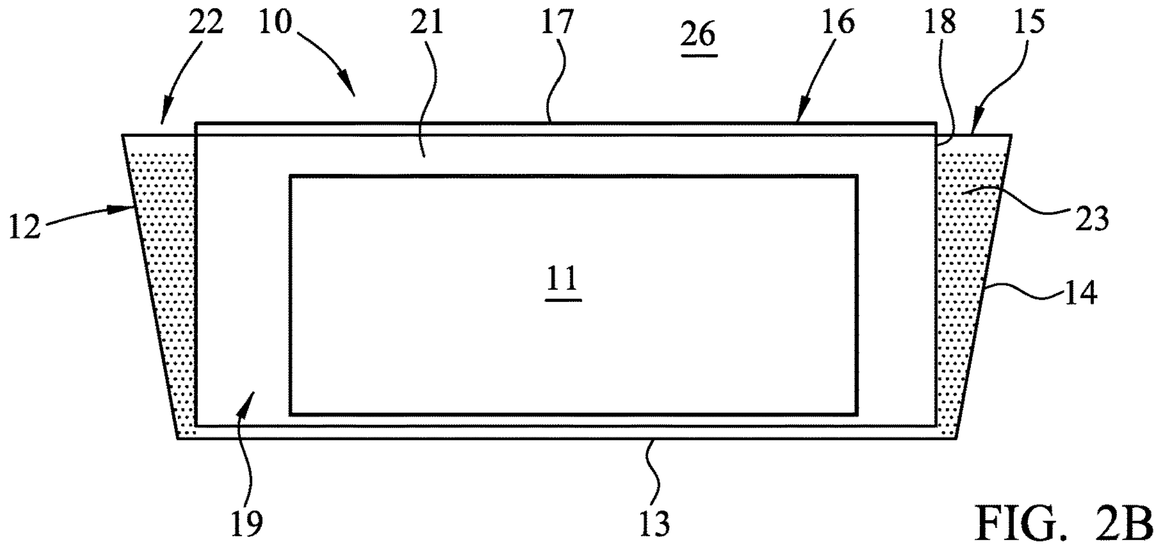
FIG. 2B shows a cross section through an assembly according to an embodiment.
Figure 2C:
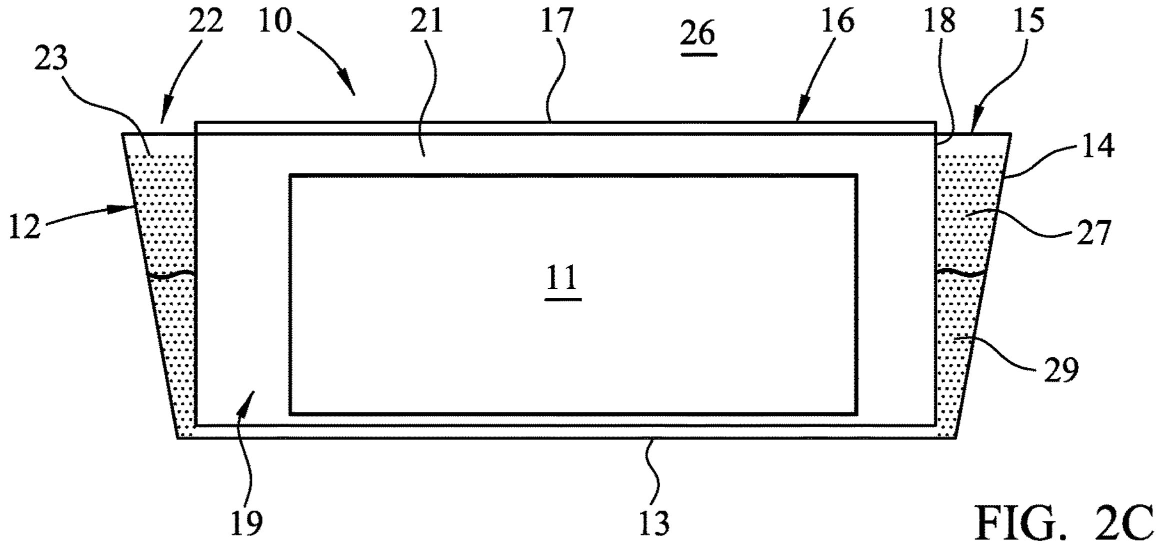
FIG. 2C shows a cross section through an assembly according to an embodiment.

FIGS. 2A to 2C disclose assemblies 10 according to further embodiments. In FIG. 2A, both the lower box 12 and the upper box 16 have oblique walls 14, 18 such that the open side 15 of the lower box 12 has a larger area than the base 13. Similarly, the open side 19 of the upper box 16 has a larger area than the cover 17. Consequently, the gap 22 formed between the walls 18 of the upper box 16 and the walls 14 of the lower box 12 is not of regular width, the upper open region of the gap 22 being larger than the lower region.

In the embodiment shown in FIG. 2B, the lower box 12 has walls 14 that extend obliquely outwards, while the walls 18 of the upper box 16 are arranged approximately perpendicular to the cover 17 of the upper box 16 and thus approximately perpendicular to the base 13 of the lower box 12. The gap 22 formed in this assembly is also larger on the open upper side than on the lower side adjacent to the boundary between the base 13 of the lower box 12 and the walls 18 of the upper box 16.

FIG. 2C shows an example of an arrangement in which the different materials are arranged in layers 29, 27 in the gap 22. The lower layer 29 contains a rare-earth element and the upper layer 27 contains an active material. This embodiment can be used to prevent materials such as oxygen or moisture, for example, from penetrating into the interior 21 from the environment 26. It is, therefore, advantageous for this active material to be arranged immediately adjacent to the boundary to the environment 26 and so in the upper layer 27. At the same time, the evaporation of rare-earth elements from the objects 11 is prevented by the lower layer 29 in the gap 22 containing the same rare-earth element as the objects 11 and being arranged at the boundary to the interior 21.

Figure 3:
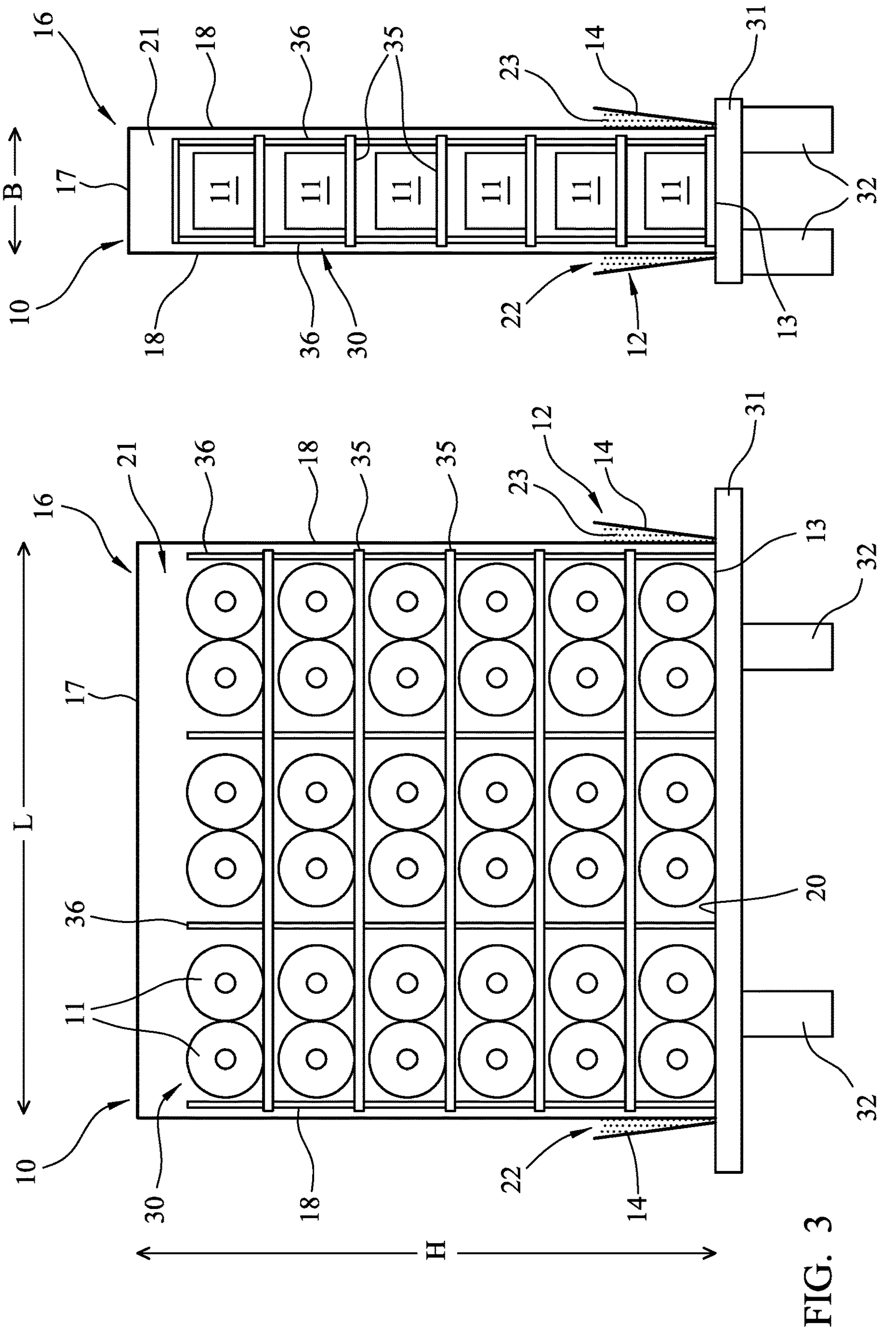
FIG. 3 shows two cross sections through an assembly having a retaining structure according to an embodiment.
Figure 4:
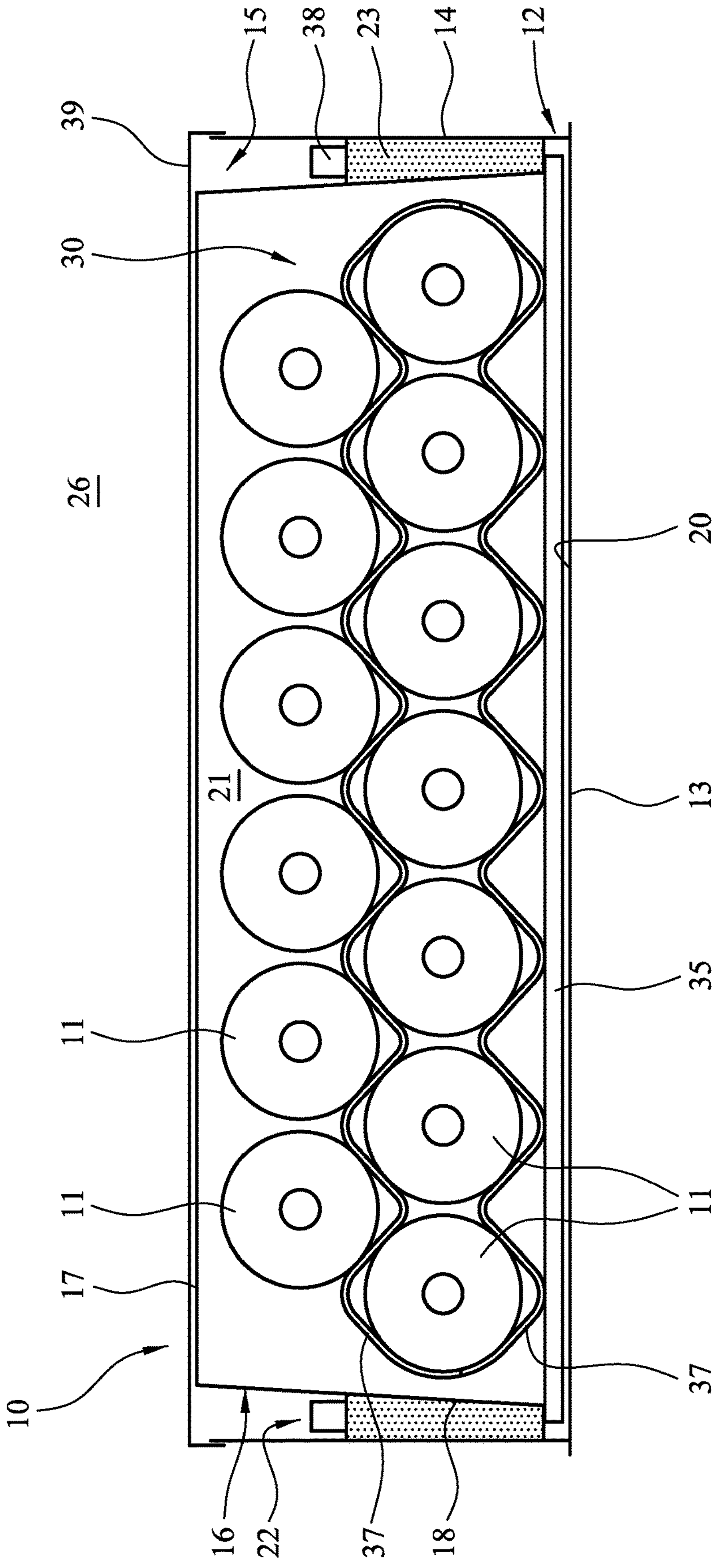
FIG. 4 shows a cross section through an assembly having a retaining structure according to an embodiment.

The assembly 10 may be used to heat treat one or more objects 11 simultaneously. To reduce the cost of the production process, a plurality of objects 11 is generally heat treated simultaneously. A retaining structure may be constructed in the interior 21 in order to arrange these objects 11 in the interior 21 of the assembly 10. FIGS. 3 and 4 each show an arrangement having a retaining structure 30, in or on which a plurality of objects 11 is arranged, and which is then covered by the upper box 16. The powder material 23 is introduced into the gap 22 and the assembly 10 is then heat treated.

FIG. 3 shows two cross sections through an assembly 10 having a retaining structure 30 according to an embodiment. The assembly 10 may be constructed on a base plate 31, which is then arranged on legs or furnace supports 32. The retaining structure 30 is arranged on the upper side 20 of the base 13 of the lower box 12.

The base plate 31 may be made of CFC (carbon fiber composite). The lower box 12, which can also be called a trough, and the upper box 16, which can also be called a hood, may be produced from sheets of molybdenum or alloyed high-temperature steel. The width B of the assembly may be less than the height H and length L of the assembly 10. This arrangement can be used to increase the cooling rate of the assembly 10.

The powder material 23 is introduced into the gap 22 that is formed between the outsides of the walls 18 of the upper box 16 and the insides of the walls 14 of the lower box 12.

In this embodiment the retaining structure 30 takes the form of a plurality of flat plates 35 that are stacked one on top of another and held spaced apart by a plurality of vertical supporting frames 36. A plurality of objects 11 is arranged on the plates 35 between adjacent supporting frames 36 such that the objects 11 are stacked in a plurality of layers inside the interiors 21.

Plates or sintering trays with a U- or V-shaped profile can be used for rounded green bodies.

FIG. 4 shows a cross section through an assembly 10 having a retaining structure 30 according to a further embodiment. In this embodiment the retaining structure 30 consists of a supporting plate 35 on which a corrugated sheet 37 is arranged to take a first layer of objects 11. An object 11 is arranged in each of the troughs in the corrugated sheets 37 so that the crests of the corrugations are arranged between two adjacent objects 11 in the layer. The corrugated sheet 37 can be produced by bending a metal sheet such as a molybdenum or iron sheet, for example. On this first layer of objects 11 lies a second corrugated sheet 37, on which a second layer of objects 11 is then placed. In this embodiment the trough 12 takes the form of an iron cannister that is open at the top.

In this arrangement the powder material 23 that is arranged in the gap 22 between the trough 12 and the hood 16 is covered by a covering frame 38 such that the covering frame 38 is arranged in the gap 22. Furthermore, the trough 12 is also closed by a cover 39. Here, the cover 39 is crimped to the lower part of the iron cannister once the gap 22 has been filled, giving a very stable set-up that can be transported easily. The hood 16 is encased in the trough 12 and the cover 39.

The assembly 10 and the retaining structure 30 according to one of the embodiments described here can be used to produce permanent NdFeB- and SmCo-based magnets and LaFeSi-based magnetocaloric moulded parts. These objects are advantageously produced using powder metallurgy methods. The starting alloys are first pulverised to fine powders with a mean particle size of preferably <20 μm and, where necessary, a plurality of such powders is mixed together to form a specific composition. These powders are then made into the desired forms by a variety of re-forming processes. This may be by means of pressing with or without a magnetic field, but the powders can also be replaced by organic binders and this mixture then processed further to form sinterable green bodies by extrusion, tape casting or similar methods. In addition to the metal powder particles, these green bodies may also contain organic components such as binders, lubricants and dispersing agents, etc. These green bodies then go on to be placed in more or less closed containers in vacuum sinter furnaces, where volatile components such as organic components or hydrogen contained in the starting powders are pumped off at temperatures below 1000° C. Lastly, the parts are sintered at approx. 1000 to 1200° C. in a vacuum, hydrogen or also in an inert atmosphere, depending on the alloy system, to produce the desired final density. The finished sintered parts are then generally subjected to various further tempering treatments at lower temperatures in order to create specific material properties.

The present invention prevents the green bodies from reacting with the air and absorbing impurities such as oxygen, nitrogen and water vapor during transport between the forming stage and the sintering furnace or during storage between these two process steps. Moreover, it can also prevent the organic components that are initially expelled at low temperatures in the sintering furnace and then deposited on cold parts of the sintering furnace from re-diffusing back onto the parts at high temperatures and causing undesired carbon contamination. In the graphite-insulated furnaces that are often preferred on cost grounds, it can prevent the methane that forms due to a reaction of the hydrogen contained in some alloys with the graphite elements from resulting in further carbon contamination of the sintered parts.

This provides sinter packaging that, firstly, permits the sintering furnace to be charged with air in the conventional manner without the green bodies made of alloys containing rare-earth elements absorbing significant quantities of oxygen and humidity. Secondly, the sinter packaging itself can also prevent the further absorption of contaminants such as oxygen, carbon and nitrogen during sinter treatment. In addition, the packaging may very largely prevent the losses of volatile rare-earth elements such as samarium and dysprosium owing to evaporation during sinter treatment at temperatures above 1000° C.

Together, all these measures result in an improvement in performance. Moreover, the improved sinter packaging obviates the need to acquire costly, fully encapsulated transport systems between the forming stage and the sintering furnace.

There are no major requirements here as to the fit between the two boxes 12, 16 as they are substantially sealed by the bulk powder 23. The powder may also be pressed into the gap 22 using a suitable tool in order to prevent cavities in the bulk getter 23. The getter powder 23 may also be bedded in with a suitable inert solvent, which can then be pumped out again before sintering. To prevent the getter powder 23 from being stirred up during transport, evacuation and gas treatment, the entire set-up may also be covered with a cover. A series of preferred embodiments are described below.

In a simple case the two boxes 12, 16 are each folded from a piece of iron foil with a thickness of 0.1 mm, for example. This technique, in which the foil is used only once, is suitable for packaging large blocks weighing in excess of 5 kg. Two foil boxes, which are open at the top and larger in periphery than the green body, are folded. The larger of the two boxes 12 is then placed over the green body 11, which is placed in a glove box filled with inert gas. The green body 11 together with the foil casing 12 is then rolled by 180° about its longitudinal axis such that it lies approximately centrally in the open foil casing, which is open at the top. The smaller foil casing 16 is then placed over the green body 11 from above and the gap 22 between the two casings 12, 16 is filled with the getter powder 23. In principle, the charge set-up can be transported to the sintering furnace in this state. Alternatively, however, the set-up can also be covered with a further foil casing in order to prevent any spillage of getter powder during further transport and to prevent the air on the upper side of the bulk getter from being stirred up excessively, and so prevent the accelerated diffusion of the oxygen.

Instead of the single-use iron foil, it is also possible to make the sinter boxes from a solid steel sheet by welding together sheets of approx. 3 mm thickness. High-temperature-resistant steels, in particular, such as austenitic steel 1.4841, for example, are suitable here. There should also be a peripheral gap of approx. 5 mm between the inner cover and the outer box, which is then filled with the getter powder. The advantage of a set-up of this type is that it can be used multiple times and the pot-shaped base simultaneously serves as a dimensionally stable support for the green bodies.

High-temperature-resistant steels also tend to distort at temperatures of 1000 to 1200° C. This means that the sinter boxes can only be reused under certain conditions. These sinter boxes, which are open on one side, may therefore preferably also be made of molybdenum.

The side walls of the sinter packaging can preferably be inclined towards one another such that the resulting gap for the getter powder is wider at the top than at the bottom. This makes it easier to introduce the getter powder and requires less getter powder to achieve the same fill level. The external dimensions selected for the inner box at the lower end of the gap are preferably almost as big as the internal dimensions of the outer box. This simplifies the positioning of the inner box, which practically centres itself. A wedge-shaped cross section of the gap has a further advantage. If the getter powder starts to shrink during the sinter treatment itself, the getter cake that forms is able to slip downwards partially and so prevent the formation of an unwanted gap between the getter and the box or sinter box during sintering.

Where requirements in terms of the purity of the handling and sintering atmosphere are particularly stringent, a plurality of sinter boxes can also be arranged one on top of another. A number of different types may also be combined. For example, SmCo green bodies that are particularly sensitive to samarium evaporation can be packed initially into an inner double box made of molybdenum and then into a more cost-effective, secondary packaging. Since the second, outer packaging is not in direct contact with the sintered parts, cost-effective, dimensionally stable materials such as graphite, for example, which would otherwise react with the sintered parts, can be used. It is, of course, necessary to ensure that the outer getter material does not react with the material of the outer packaging.

The inner sinter boxes may preferably be taller than the associated outer sinter boxes. This makes the removal of the inner box after sintering easier. Alternatively, eyes or lugs may also be attached to the inner sinter box and grasped with the aid of an appropriate tool in order to open the sinter box.

The inner or lower boxes with the powder material such as a getter, for example, in the gap can be covered with a further hood. This hood may be a simple thin iron foil sheet (single-use packaging), but may also be a more solid, reusable hood. This covering hood prevents the powder from being stirred up during transport and heat treatment and so helps to maintain the activity of the material. This cover need not be a fully closed hood. It may simply be a ring-shaped frame that covers the gap containing the powder.

The height of the powder introduced into the gap should preferably be at least 1 cm. If the bulk powder level is lower there is a risk that the getter will not work sufficiently effectively. The width of the gap filled with the powder should preferably be 2 to 10 mm on the upper side and 0 to 10 mm on the underside. A wedge-shaped gap with a width of 5 mm at the top and 0 mm at the bottom is particularly advantageous.

Before transporting the filled sintering container, nitrogen—the inert gas usually used when handling green bodies—may preferably be replaced by argon. For example, the container complete with the green body and powder can be evacuated in a lock and then flooded with argon. As argon is heavier than air, this further slows the diffusion of oxygen into the powder bed and the activity of the getter is better retained for the sinter treatment itself.

The powder introduced into the gap may be an inert material such as $SiO_2$, $Al_2O_3$ or rare-earth oxides, for example. Where this is the case, the powder simply acts as a diffusion barrier to gas exchange. The powder may also preferably consist of activated carbon or fine metal powders such as Al, Mg, Zr, Ti or Ca, for example, as used in vacuum and pipe technology. In such cases, the powder acts as an active getter and binds impurities as they flow through it. The getter powder itself preferably has a rare-earth content of at least 15 wt % and a grain size of $<500$ μm. In principle, all rare-earth elements La, Ce, Pr, Nd, Pm, Sm, Eu, Gd, Tb, Dy, Ho, Er, Tm, Yb and Lu, including Y, are suitable.

The getter powder may preferably have a mean particle size of $>50$ μm. This reduces the sinter activity of the getter powder, and so reduces the risk of the two sinter boxes being sintered together by the getter powder and being impossible to separate from one another easily after the sinter treatment. The getter powder may preferably contain $>50\%$ and have a particle size of $<10$ μm. This percentage of fine material considerably increases the reactivity of the getter and so improves the getter effect. The particle size and composition of the getter powder may be set such that it sinters itself to a sealed porosity during the sinter treatment, slides down the oblique side wall shown in FIG. 2A and connects the two sinter boxes tightly to one another. The getter powders may preferably have the same composition as the parts to be sintered. This means that the coarse powders and mixtures available in the process can be used as they are with the pulverised fine powders. The filter dusts occurring during pulverisation of the fine powder can also be mixed into the getter powders. The getter powders may preferably be produced by pulverising defective sintered parts. It is, however, important that these defective parts be free of organic residues and not subject to excessive oxidisation. Getter powders may preferably be produced by pulverising getter powders already used in past sinter treatments. Pulverising creates fresh surfaces and so reactivates the getter powders.

Powders are preferably only reused as getter powders if the rare-earth-element content (SE) satisfies the following equation:

$$SE>15\text{ wt }\%+\text{sum}(O+C+N)*10,$$

where O, C and N are the oxygen, carbon and nitrogen contents in wt %.

The getter powder may preferably consist of a mixture of two components with different rare-earth-element contents. For example, one component may contain an intermetallic phase such as $Nd_2Fe_{14}B$, $Sm_2Co_{17}$, $Sm_2Fe_{17}$, $SmCo_5$ or $(La,Ce)(Fe,Si)_{13}$, for example, while the second component consists of rare-earth hybrids such as $NdH_2$, $DyH_2$, $SmH_2$ or $LaH_2$, for example. At the sintering temperatures used, the intermetallic phases continue to form a stable framework while the components richer in rare-earth elements provide a better getter effect owing to their greater reactivity.

Recycled getter powders that no longer satisfy this condition may preferably be sufficiently reactivated by the addition of a component rich in rare-earth elements.

Figure 5A:
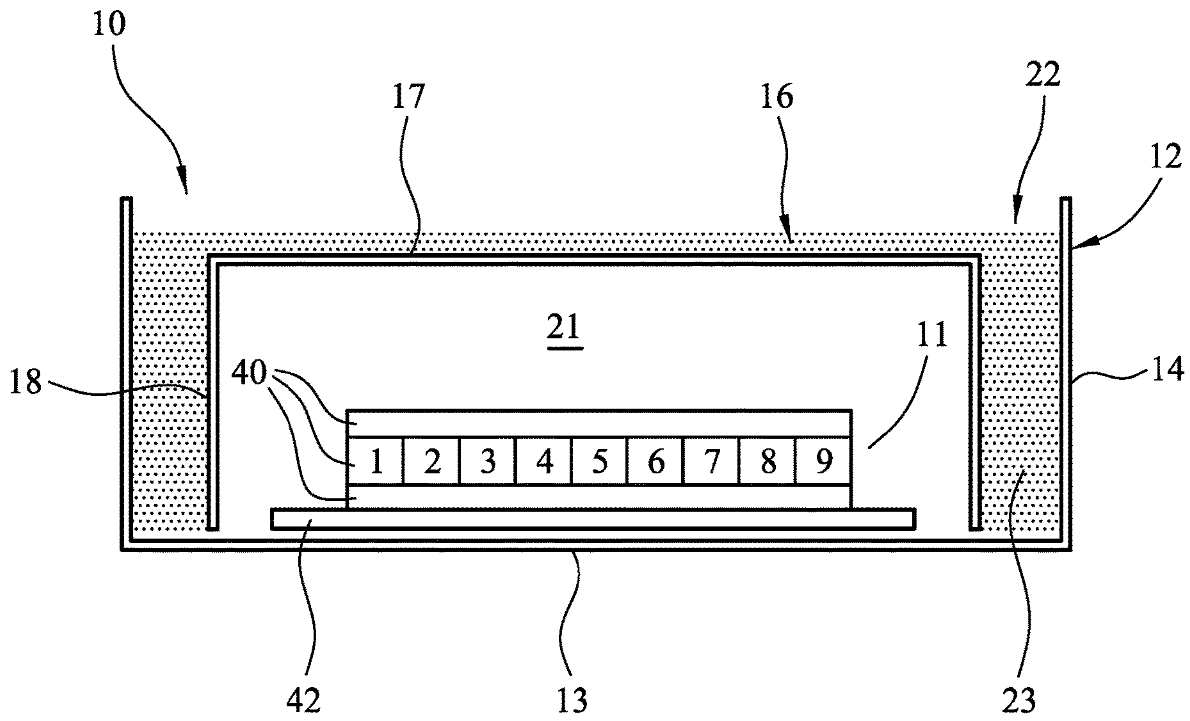
FIG. 5A shows a cross section through an assembly according to an embodiment, in which a plurality of plates made of a LaSiFe alloy is arranged.

FIG. 5A shows a cross section through an assembly 10 according to an embodiment in which a plurality of objects 11 in the form of plates made of a LaSiFe alloy are heat treated. The LaSiFe alloy plates are stacked one on top of another. This stack is located on a molybdenum plate 41 and separated from it by means of a $Nd_2O_3$ separating agent. This arrangement is placed in a lower box 12 and covered with an upper box 16. The gap 22 between the walls 14, 18 of the lower and upper boxes 12, 16 is filled with getter powder 23.

The LaSiFe alloy is magnetocalorically active. $La_{1-a}R_a(Fe_{1-x-y}T_yM_x)_{13}H_zC_b$ is one example of a magnetocalorically active phase with a $NaZn_{13}$-type structure, where M is Si and optionally Al, T is one or more of the elements from the group consisting of Mn, Co, Ni, Ti, V and Cr, and R is one or more of the elements from the group consisting of Ce, Nd, Y and Pr, where $0 \le a \le 0.5$, $0.05 \le x \le 0.2$, $0.003 \le y \le 0.2$, $0 \le z \le 3$ and $0 \le b \le 1.5$. The $La_{1-a}R_a(Fe_{1-x-y}T_yM_x)_{13}H_zC_b$ starting powder of which the plates are formed is used as the getter powder 23.

Figure 5B:
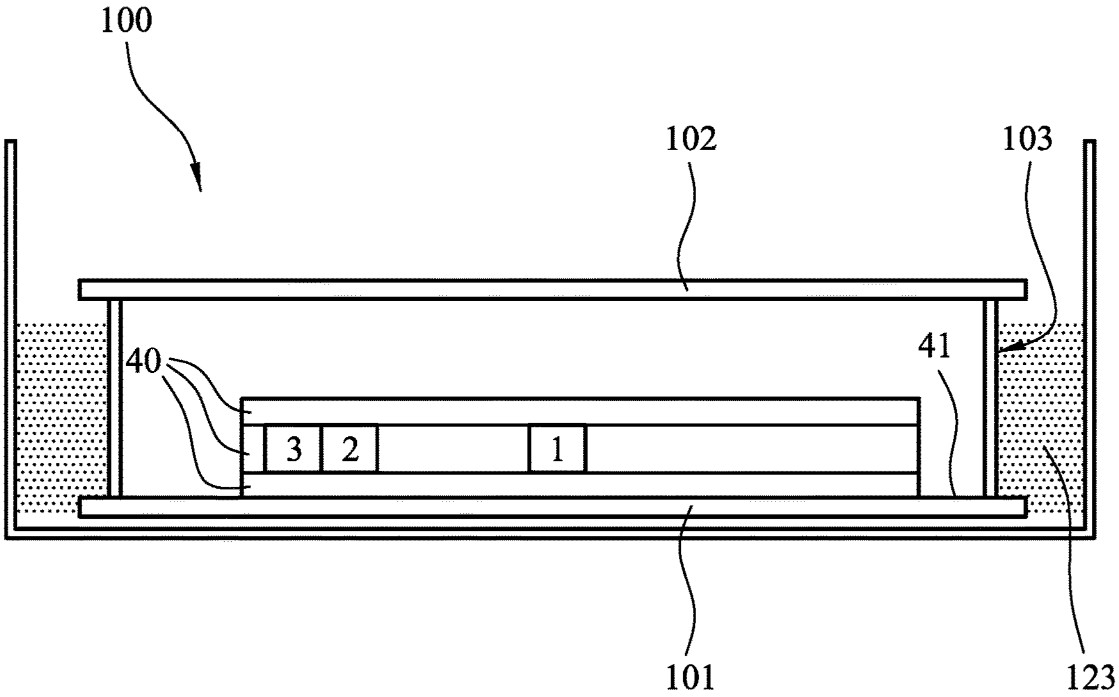
FIG. 5B shows a cross section through a comparative assembly in which a plurality of plates made of a LaSiFe alloy is arranged.

FIG. 5B shows a cross section through a comparative assembly 100 in which a plurality of stacked plates 40 made of the LaSiFe alloy is arranged on a molybdenum plate 41. The molybdenum plate 41 is separated from the plates made of the LaSiFe alloy by means of a CaO separating agent. Rather than gas-tight boxes, this comparative assembly 100 contains a base plate 101 and a covering plate 102, the covering plate 102 being held above the plates 40 by means of a frame 103. This frame 103 is surrounded by the getter powder 123. The $La_{1-a}R_a(Fe_{1-x-y}T_yM_x)_{13}H_zC_b$ starting powder is used as the getter powder 123.

FIGS. 5A and 5B also show the points in the stack from which samples were taken to measure the content of the elements carbon, oxygen and nitrogen.

The results for assembly 10 according to the invention as shown in FIG. 5A are summarised in Table 1.

TABLE 1

(figures in wt %)

| Probe # | C | O | N |
|---|---|---|---|
| 1 | 0.014 | 0.35 | 0.014 |
| 2 | 0.011 | 0.34 | 0.013 |
| 3 | 0.010 | 0.33 | 0.012 |
| 4 | 0.009 | 0.32 | 0.012 |
| 5 | 0.014 | 0.30 | 0.013 |
| 6 | 0.013 | 0.32 | 0.013 |
| 7 | 0.010 | 0.32 | 0.013 |
| 8 | 0.011 | 0.31 | 0.013 |
| 9 | 0.010 | 0.33 | 0.014 |
| Average | 0.011 | 0.32 | 0.013 |

These results show that for the plates heat treated in the assembly according to the invention there are no major differences between the edge parts, i.e. samples 1 and 9, and the parts from the centre, i.e. parts 4 and 5. These results show that this set-up can be used to achieve a uniform composition and so uniform magnetocaloric properties across the area of the heat treated plates.

By contrast, in the comparative assembly 100 shown in FIG. 5*b* the oxygen content measured in the sample from the edge of the stack is higher than that measured in the sample from the middle, see Table 2.

TABLE 2

(figures in wt %)

| Probe # | C | O | N |
|---|---|---|---|
| Starting powder | 0.018 | 0.25 | 0.034 |
| Reference slide | 0.030 | 0.55 | 0.028 |
| 1 | 0.023 | 0.54 | 0.026 |
| 2 | 0.024 | 0.51 | 0.027 |
| 3 | 0.037 | ~1.1 | 0.018 |

This comparison shows that the gas-tight boxes together with the getter powder can be used successfully to prevent negative influences on the composition of the content of the assembly, i.e. the composition of the LaSiFe plates, caused by the external atmosphere in the furnace. Consequently, the assembly according to the invention can be used to improve the magnetocaloric properties of the plates.

Figure 6:
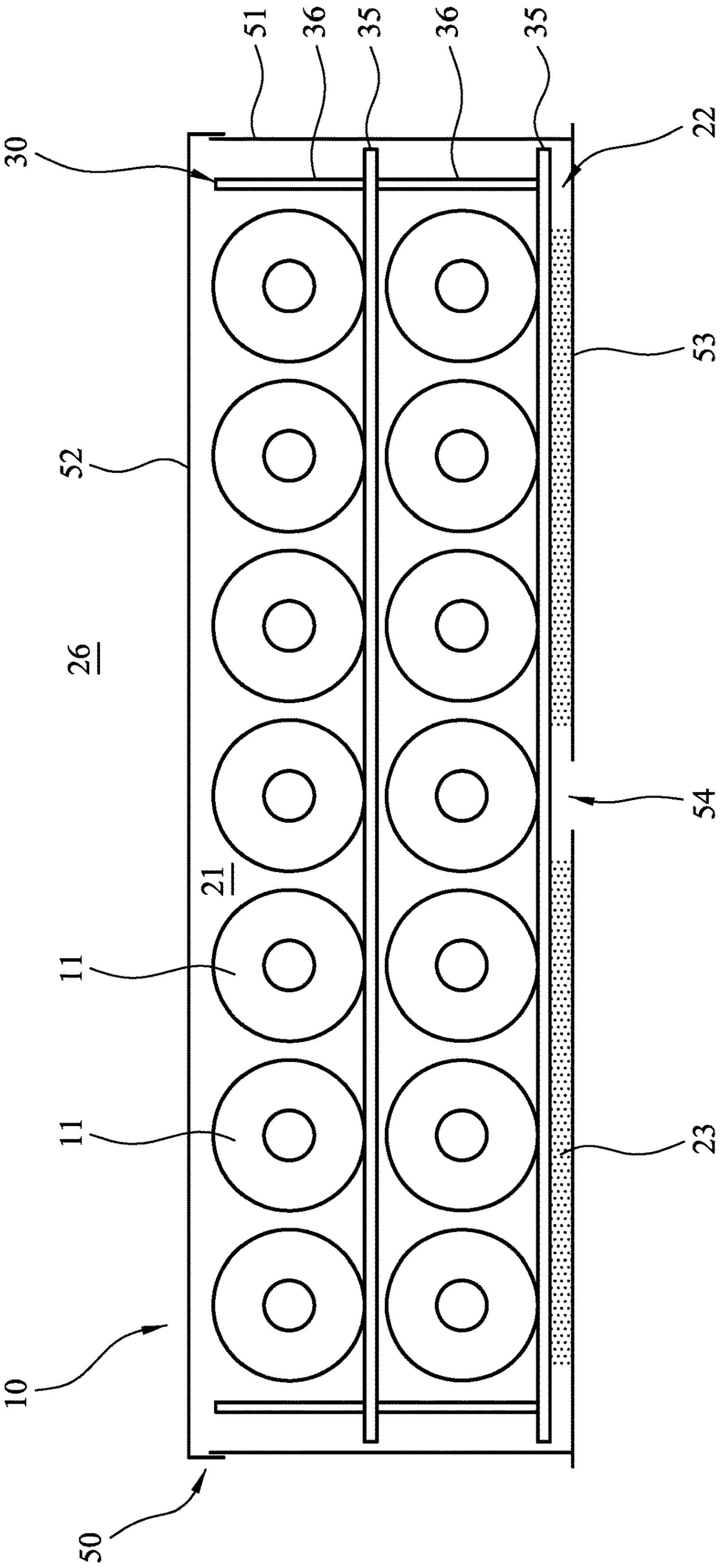
FIG. 6 shows a cross section through an assembly having a retaining structure according to an embodiment.

FIG. 6 shows a cross section through an assembly 10 having a retaining structure 30 according to a further embodiment. In this embodiment, as in the embodiment shown in FIG. 3, the retaining structure 30 consists of supporting plates 35 and supporting frames 36. Here, the lowermost supporting plate 35 also performs the function of the trough 12 in the assembly shown in FIG. 1. Together with the cannister base 53, it forms the gap 22 for receiving the getter 23. Here, the cannister base 53 is connected to the cannister wall 51 and the cannister cover 52 in a gas-tight manner, e.g. by welding. Together, the cannister wall 51, the cannister cover 52 and the cannister base 53 form a cannister 50 that corresponds to the hood 16 in FIG. 1. The canister base 53 has a hole that permits gas exchange between the interior 21 and the exterior 26. The hole 54 in this embodiment corresponds to the opening 15 in the trough 15 in FIG. 1.

The gas exchange between the sintered parts 11 in the interior 21 and the exterior takes place through this hole 54, the gas having to flow through the getter 23 since the outer can 50 is closed in a gas-tight manner by welding, crimping or soldering, for example. In this embodiment at least the gas-tight connection of the cannister cover 52 to the cannister wall 51 must be carried after the cannister has been filled with the sintered parts.

The invention claimed is:

1. A method for heat treating an object, the method comprising the following:

providing a lower box comprising a base, walls that surround the base, and an open side, providing an upper box comprising a cover, walls that surround the cover and an open side, arranging the one or more objects on the base of the lower box, covering the one or more objects with the upper box such that the open side of the upper box faces the base of the lower box, the walls of the upper box are arranged on the base of the lower box and a gap is formed between the walls of the upper box and the walls of the lower box, introducing a powder material into the gap in order to form an assembly having an interior, the powder material providing a mechanical obstacle to gas exchange between the interior and external environment, covering the gap filled with the powder material by a frame and/or a cover, and heat treating the assembly.

2. A method according to claim 1, wherein an inert material and/or a reactive material is used as the powder material.

3. A method according to claim 1, wherein the powder material comprises layers of different powder materials.

4. A method according to claim 3, wherein the powder material comprises a first layer containing an inert material and a second layer containing a reactive material.

5. A method according to claim 2, wherein the inert material is an oxide and/or the reactive material is an oxygen getter.

6. A method according to claim 2, wherein the reactive material is activated carbon or a metal powder.

7. A method according to claim 2, wherein the powder material comprises at least 15 wt % of at least one element selected from the group consisting of Sc, Y, La, Ce, Pr, Nd, Pm, Sm, Eu, Gd, Tb, Dy, Ho, Er, Tm, Yb and Lu.

8. A method according to claim 1, wherein the base, the walls and seams between the base and the walls of the lower box are gas-tight and wherein the cover, the walls and the seams between the cover and the walls of the upper box are gas-tight.

9. A method according to claim 1, wherein the assembly is subjected to heat treatment at a temperature above 900° C.

10. A method according to claim 1, wherein the upper and lower boxes are made of molybdenum, an alloyed high-temperature steel or iron.

11. A method according to claim 1, wherein the powder material comprises at least one element that is contained in the object in order to compensate for the evaporation of this same element from the object and/or to increase the vapor pressure of the element in the interior of the assembly.

12. A method according to claim 1, wherein the object comprises $La_{1-a}R_a(Fe_{1-x-y}T_yM_x)_{13}H_zC_b$, M including Si and optionally including Al, T being at least one element selected from the group consisting of Mn, Co, Ni, Ti, V and Cr, and R being at least one element selected from the group consisting of Ce, Nd, Y and Pr, where $0 \le a \le 0.5$, $0.05 \le x \le 0.2$, $0.003 \le y \le 0.2$, $0 \le z \le 3$ and $0 \le b \le 1.5$.

* * * * *